Figure 1:
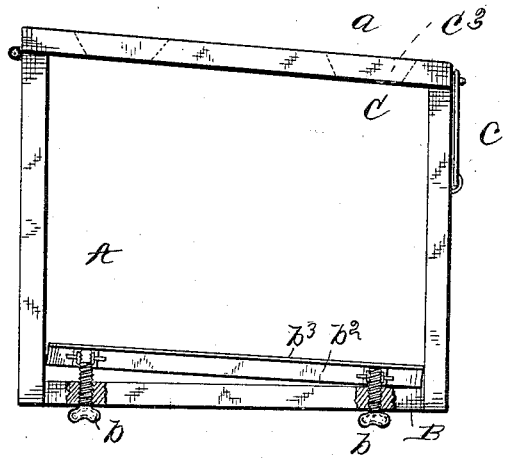

(No Model.)

N. COURT.
EGG TESTER.

No. 398,236. Patented Feb. 19, 1889.

WITNESSES.
Marcus L. Byng.
R. M. Elliott.

INVENTOR,
Nicholas Court,
by Louis Bagger & Co.
Attorneys.

UNITED STATES PATENT OFFICE.

NICHOLAS COURT, OF WILL'S CREEK, OHIO.

EGG-TESTER.

SPECIFICATION forming part of Letters Patent No. 398,236, dated February 19, 1889.

Application filed August 6, 1888. Serial No. 282,037. (No model.)

*To all whom it may concern:*

Be it known that I, NICHOLAS COURT, a citizen of the United States, and a resident of Will's Creek, in the county of Coshocton and State of Ohio, have invented certain new and useful Improvements in Egg-Testers; and I do hereby declare that the following is a full, clear, and exact description of the invention, which will enable others skilled in the art to which it appertains to make and use the same.

This invention relates to egg-testers.

The object is to produce an egg-tester which shall be of such construction that the condition of an egg may be readily ascertained—that is, determined whether good or bad; furthermore, to produce an egg-tester which shall be simple in construction, efficient and durable in use, and comparatively inexpensive of production.

With these objects in view the invention consists in a box or casing having an adjustable bottom fitting therein and carrying a mirror and means for adjusting the same, whereby the said mirror may be elevated or depressed so as to refract the light to any desired angle.

Furthermore, the invention consists in the combination, with the box or casing having an adjustable bottom secured therein, of a hinged cover fitting on the said casing and provided with suitable openings in which to place the eggs to be examined; and, finally, the invention consists in the various novel details of construction, as will be hereinafter fully described in the specification, illustrated in the drawings, and pointed out in the claim.

Figure 2:
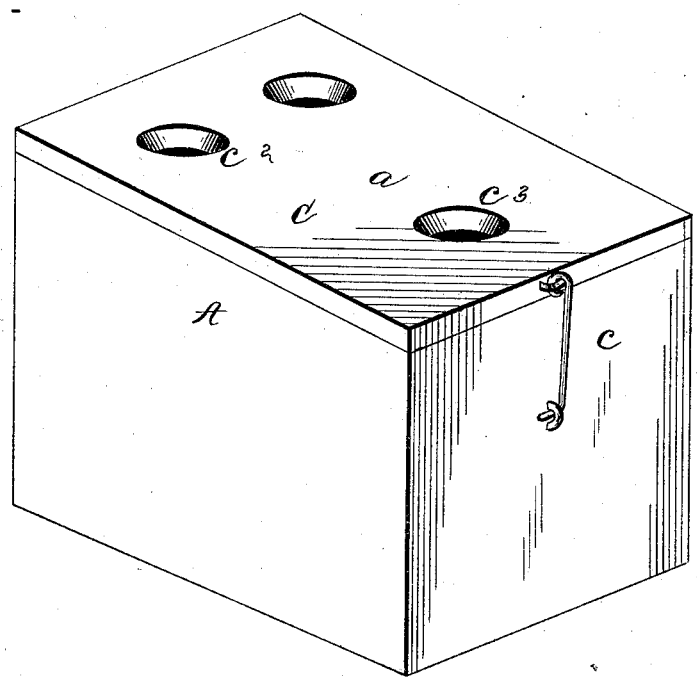

In the accompanying drawings, forming part of this specification, and in which like letters of reference indicate corresponding parts, Figure 1 is a side elevation of the box or casing, one side being removed, showing the adjustable bottom and the mirror secured thereto and the set-screws for elevating and depressing the same. Fig. 2 is a perspective view of the device, showing the lid provided with suitable openings in which to place the eggs to be tested.

Referring to the drawings, A designates the box or casing, which may be made of any suitable material, but preferably of wood, the top of which is made slanting, as shown at $a$.

B designates the bottom, which is rigidly secured to the casing, and has extending through it at its four corners set-screws $b$, which are designed to engage the false bottom $b^2$, on which the mirror $b^3$ is secured. Thus it will be seen that the glass case can be adjusted to the proper inclination to reflect the egg to the eye of the inspector.

C designates the lid, which is provided with a number of countersunk openings, $c^2$, in which the eggs to be tested are placed. This lid is hinged at one end to the box or casing, and at the other end is held in place by means of a hook, $c$.

The mode of operation is as follows: When it is desired to test the eggs, they are placed in the upper openings, $c^2$, of which there may be any number; but only two are shown here, and the eye is applied to the lower opening, $c^3$. The light passing through the eggs is reflected on the mirror, which, as before stated, is tilted so as to produce the best results, and by this means the condition of the egg may be readily ascertained.

It will be seen that though this device is comparatively simple and inexpensive of production it is highly useful, efficient in use, and may be constructed at a comparatively nominal figure.

Having thus fully described my invention, what I claim as new, and desire to secure by Letters Patent, is—

In an egg-tester, the combination, with the stationary bottom provided with set-screws passing through the openings in the same, of the adjustable bottom carrying a mirror mounted within the casing and engaging the said screws, whereby the said bottom may be moved to any desired angle, substantially as described.

In testimony that I claim the foregoing as my own I have hereunto affixed my signature in presence of two witnesses.

NICHOLAS COURT.

Witnesses:
J. S. ELLIOTT,
JOHN P. HAY.